(12) United States Patent
Singh et al.

(10) Patent No.: US 11,539,722 B2
(45) Date of Patent: Dec. 27, 2022

(54) SECURITY THREAT DETECTION BASED ON PROCESS INFORMATION

(71) Applicant: VMware, Inc., Palo Alto, CA (US)

(72) Inventors: Baibhav Singh, Sunnyvale, CA (US); Jayant Jain, Cupertino, CA (US)

(73) Assignee: VMWARE, INC., Palo Alto, CA (US)

( * ) Notice: Subject to any disclaimer, the term of this patent is extended or adjusted under 35 U.S.C. 154(b) by 27 days.

(21) Appl. No.: 16/929,074

(22) Filed: Jul. 14, 2020

(65) Prior Publication Data

US 2022/0021686 A1  Jan. 20, 2022

(51) Int. Cl.
*H04L 29/06* (2006.01)
*H04L 9/40* (2022.01)
*G06F 21/53* (2013.01)
*G06F 9/455* (2018.01)
*H04L 61/4511* (2022.01)

(52) U.S. Cl.
CPC ...... *H04L 63/1416* (2013.01); *G06F 9/45558* (2013.01); *G06F 21/53* (2013.01); *H04L 61/4511* (2022.05); *H04L 63/20* (2013.01); *G06F 2009/45587* (2013.01); *G06F 2221/033* (2013.01); *H04L 2463/144* (2013.01)

(58) Field of Classification Search
CPC . H04L 63/1416; H04L 63/20; H04L 63/0236; H04L 63/145; H04L 63/1433; G06F 21/53
USPC .......................................................... 726/23
See application file for complete search history.

(56) References Cited

U.S. PATENT DOCUMENTS 9,560,072 B1 * 1/2017 Xu ....................... H04L 63/1416
2020/0249874 A1 * 8/2020 Foo ..................... G06F 11/1068

* cited by examiner

*Primary Examiner* — Longbit Chai
(74) *Attorney, Agent, or Firm* — SU IP Consulting (57) ABSTRACT

Example methods and systems for a computer system to perform security threat detection are described. In one example, a computer system may intercept an egress packet from a virtualized computing instance to pause forwarding of the egress packet towards a destination and obtain process information associated a process from which the egress packet originates. The computer system may initiate security analysis based on the process information. In response to determination that the process is a potential security threat based on the security analysis, the egress packet may be dropped, and a remediation action performed. Otherwise, the egress packet may be forwarded towards the destination.

21 Claims, 6 Drawing Sheets

SECURITY THREAT DETECTION BASED ON PROCESS INFORMATION

BACKGROUND

Virtualization allows the abstraction and pooling of hardware resources to support virtual machines in a software-defined data center (SDDC). For example, through server virtualization, virtualized computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, it is desirable to detect potential security threats that may affect the performance of hosts and VMs in the SDDC.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1:
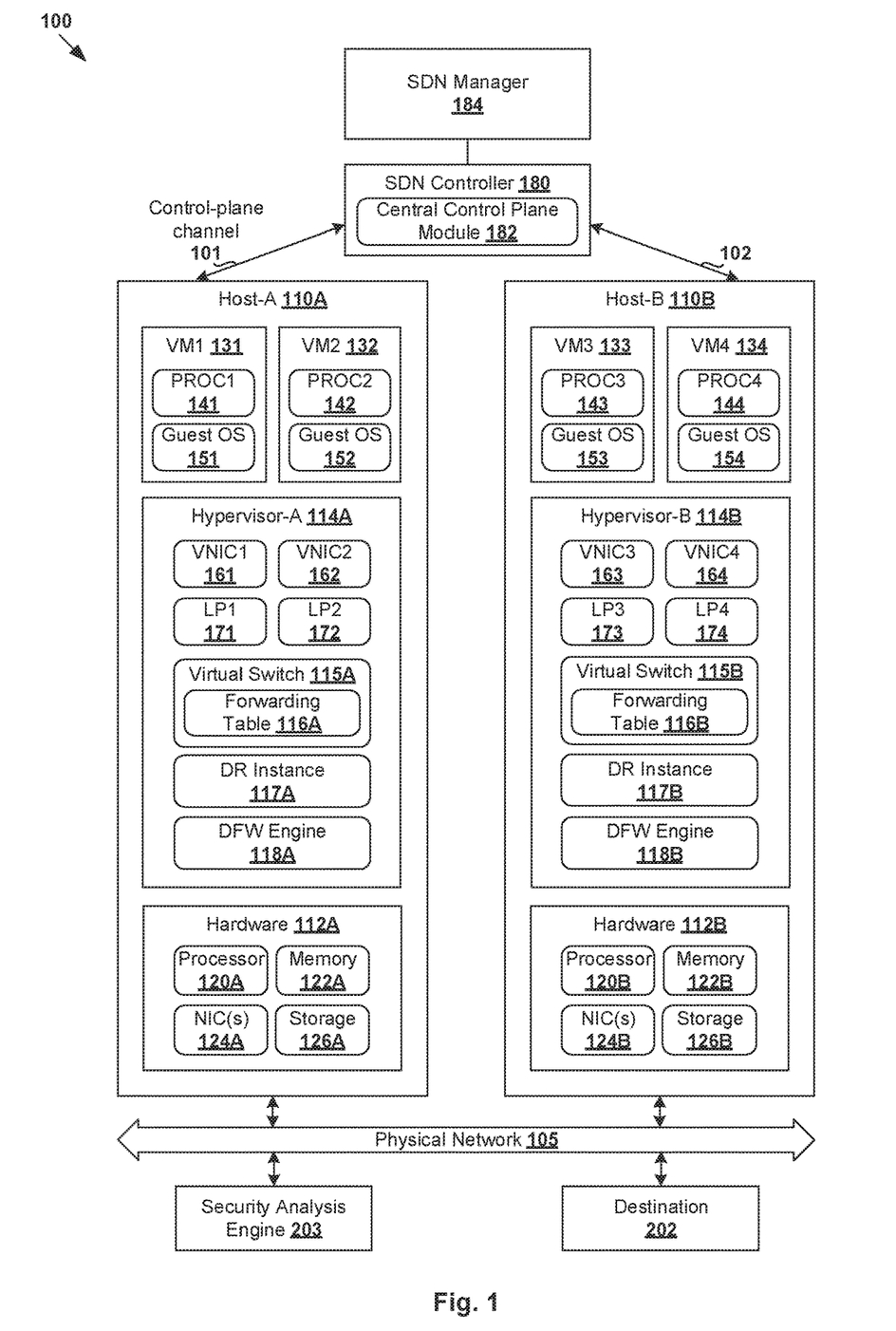
FIG. 1 is a schematic diagram illustrating an example software-defined networking (SDN) environment in which security threat detection based on process information may be performed.

Challenges relating to data center security will now be explained in more detail using FIG. 1, which is a schematic diagram illustrating example software-defined networking (SDN) environment 100 in which security threat detection based on process information may be performed. It should be understood that, depending on the desired implementation, SDN environment 100 may include additional and/or alternative components than that shown in FIG. 1. Although the terms "first" and "second" are used to describe various elements, these elements should not be limited by these terms. These terms are used to distinguish one element from another. For example, a first element may be referred to as a second element, and vice versa.

SDN environment 100 includes multiple hosts 110A-B that are inter-connected via physical network 105. Each host 110A/110B may include suitable hardware 112A/112B and virtualization software (e.g., hypervisor-A 114A, hypervisor-B 114B) to support various VMs. For example, hosts 110A-B may support respective VMs 131-134. Hardware 112A/112B includes suitable physical components, such as central processing unit(s) (CPU(s)) or processor(s) 120A/120B; memory 122A/122B; physical network interface controllers (NICs) 124A/124B; and storage disk(s) 126A/126B, etc. In practice, SDN environment 100 may include any number of hosts (also known as a "host computers", "host devices", "physical servers", "server systems", "transport nodes," etc.), where each host may be supporting tens or hundreds of virtual machines (VMs).

Hypervisor 114A/114B maintains a mapping between underlying hardware 112A/112B and virtual resources allocated to respective VMs. Virtual resources are allocated to respective VMs 131-134 to support a guest operating system and application(s); see 141-144, 151-154. Any suitable applications 141-144 may be implemented, such as user- or kernel-space processes labelled "PROC1" to "PROC4." For example, virtual resources may include virtual CPU, guest physical memory, virtual disk, virtual network interface controller (VNIC), etc. Hardware resources may be emulated using virtual machine monitors (VMMs). For example, VNICs 161-164 are virtual network adapters for respective VMs 131-134. Each VNIC may be emulated by a corresponding VMM (not shown) instantiated by hypervisor 114A/114B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B implements virtual switch 115A/115B and logical distributed router (DR) instance 117A/117B to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-B and represented internally using forwarding tables 116A-B at respective virtual switches 115A-B. Forwarding tables 116A-B may each include entries that collectively implement the respective logical switches. Further, logical DRs that provide logical layer-3 connectivity may be implemented collectively by DR instances 117A-B and represented internally using routing tables (not shown) at respective DR instances 117A-B. The routing tables may each include entries that collectively implement the respective logical DRs.

Packets may be received from, or sent to, each VM via an associated logical port. For example, logical switch ports 171-174 are associated with respective VMs 131-134. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-B in FIG. 1, whereas a "virtual switch" may refer generally to a software switch or software implementation of a physical switch. In practice, there is usually a one-to-one mapping between a logical port on a logical switch and a virtual port on virtual switch 115A/115B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks. In the example in FIG. 1, VM1 131 on host-A 110A and VM3 133 on host-B 110B may be connected to the same logical switch and located on the same logical layer-2 segment, such as a segment with virtual network identifier (VNI)=6000.

SDN controller 180 and SDN manager 184 are example network management entities in SDN environment 100. One example of an SDN controller is the NSX controller component of VMware NSX® (available from VMware, Inc.) that operates on a central control plane. SDN controller 180 may be a member of a controller cluster (not shown for simplicity) that is configurable using SDN manager 184 operating on a management plane. Network management entity 180/184 may be implemented using physical machine(s), VM(s), or both. Logical switches, logical routers, and logical overlay networks may be configured using SDN controller 180, SDN manager 184, etc. To send or receive control information, a local control plane (LCP) agent (not shown) on host 110A/110B may interact with central control plane (CCP) module 182 at SDN controller 180 via control-plane channel 101/102.

Hosts 110A-B may also maintain data-plane connectivity with each other via physical network 105 to facilitate communication among VMs 131-134. Hypervisor 114A/114B may implement a virtual tunnel endpoint (VTEP) (not shown) to encapsulate and decapsulate packets with an outer header (also known as a tunnel header) identifying the relevant logical overlay network (e.g., VNI). For example in FIG. 1, hypervisor-A 114A implements a first VTEP associated with (IP address=IP-A, VTEP label=VTEP-A). Hypervisor-B 114B implements a second VTEP with (IP-B, VTEP-B). Encapsulated packets may be sent via an end-to-end, bi-directional communication path (known as a tunnel) between a pair of VTEPs over physical network 105.

One of the challenges in SDN environment 100 is improving the overall data center security. To protect VMs 131-134 against security threats caused by unwanted packets, hypervisor 114A/114B may implement distributed firewall (DFW) engine 118A/118B to filter packets to and from associated VMs 131-134. For example, at host-A 110A, hypervisor 114A implements DFW engine 118A to filter packets for VM1 131 and VM2 132. SDN controller 180 may be used to configure firewall rules that are enforceable by DFW engine 118A/118B. In practice, packets may be filtered according to firewall rules at any point along the datapath from a source (e.g., VM1 131) to a physical NIC (e.g., 124A). In one embodiment, a filter component (not shown) may be incorporated into each VNIC 141-144 to enforce firewall rules configured for respective VMs 131-134. The filter components may be maintained by DFW engines 118A-B.

Figure 2:
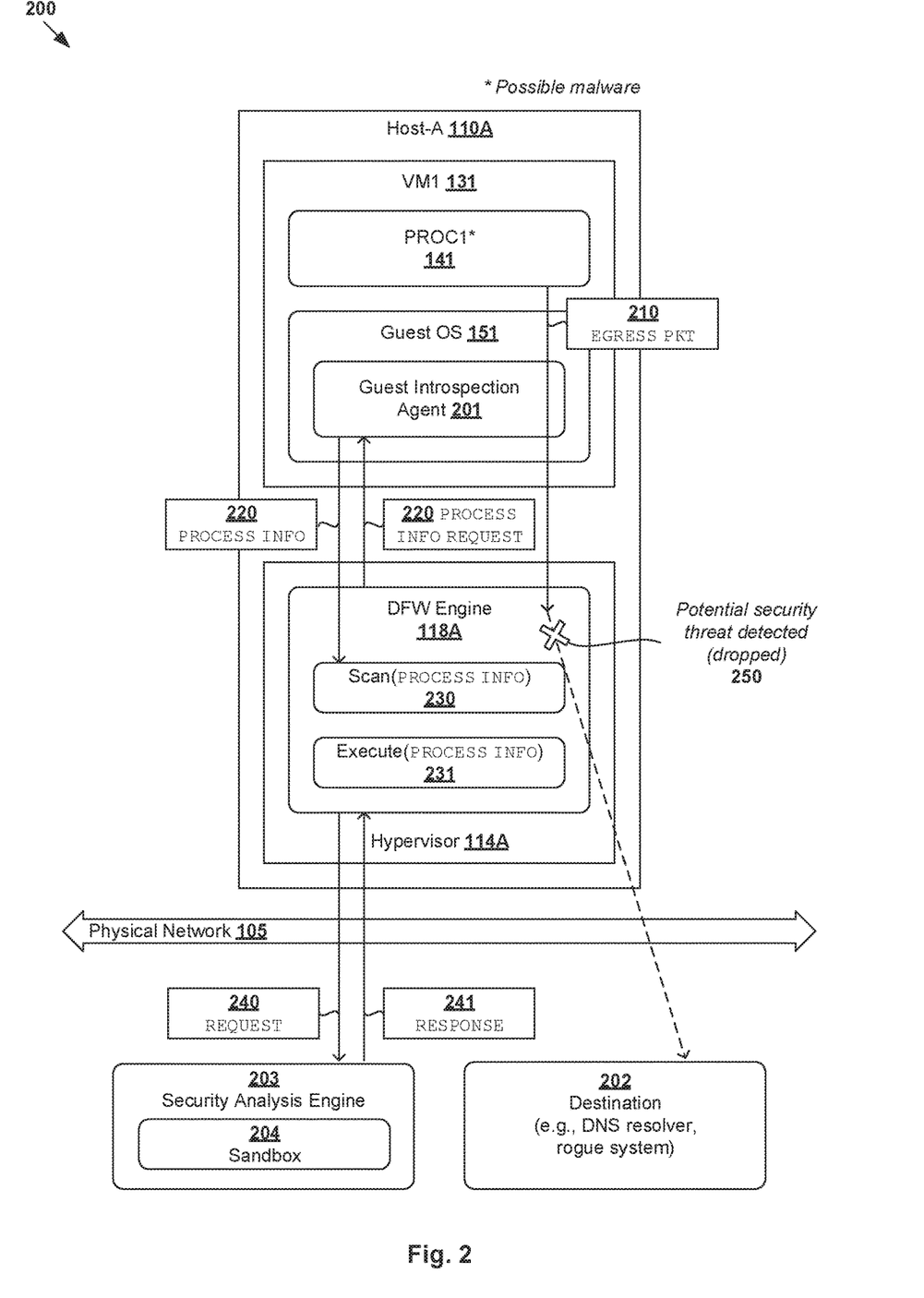
FIG. 2 is a schematic diagram illustrating an example security threat detection based on process information in an SDN environment.

In practice, DFW engine 118A/118B might not be able to defend against all possible security threats. An example is shown in FIG. 2, which is a schematic diagram illustrating example security threat detection 200 based on process information in SDN environment 100. In this example, a malware-infected process (see PROC1 141) running on VM1 131 might attempt to send an egress packet (see 210) to a destination (e.g., rogue system) as part of a malicious attack against host-A 110A and/or other entities in SDN environment 100. In this case, it is desirable to detect whether PROC1 141 on VM1 131 has been compromised.

Security Threat Detection

According to examples of the present disclosure, security threat detection may be improved to strengthened data center security. Examples of the present disclosure may be implemented to intercept an egress packet (e.g., 210 in FIG. 2) originating from a process (e.g., PROC1 141 running on VM1 131), and perform a security analysis to assess whether the process is a potential security threat. Unlike conventional approaches that rely on URL reputation and/or blacklist, more in-depth security analysis may be performed based on process information (e.g., binary information, memory information) associated with the process, thereby improving malware defense and data center security.

Figure 3:
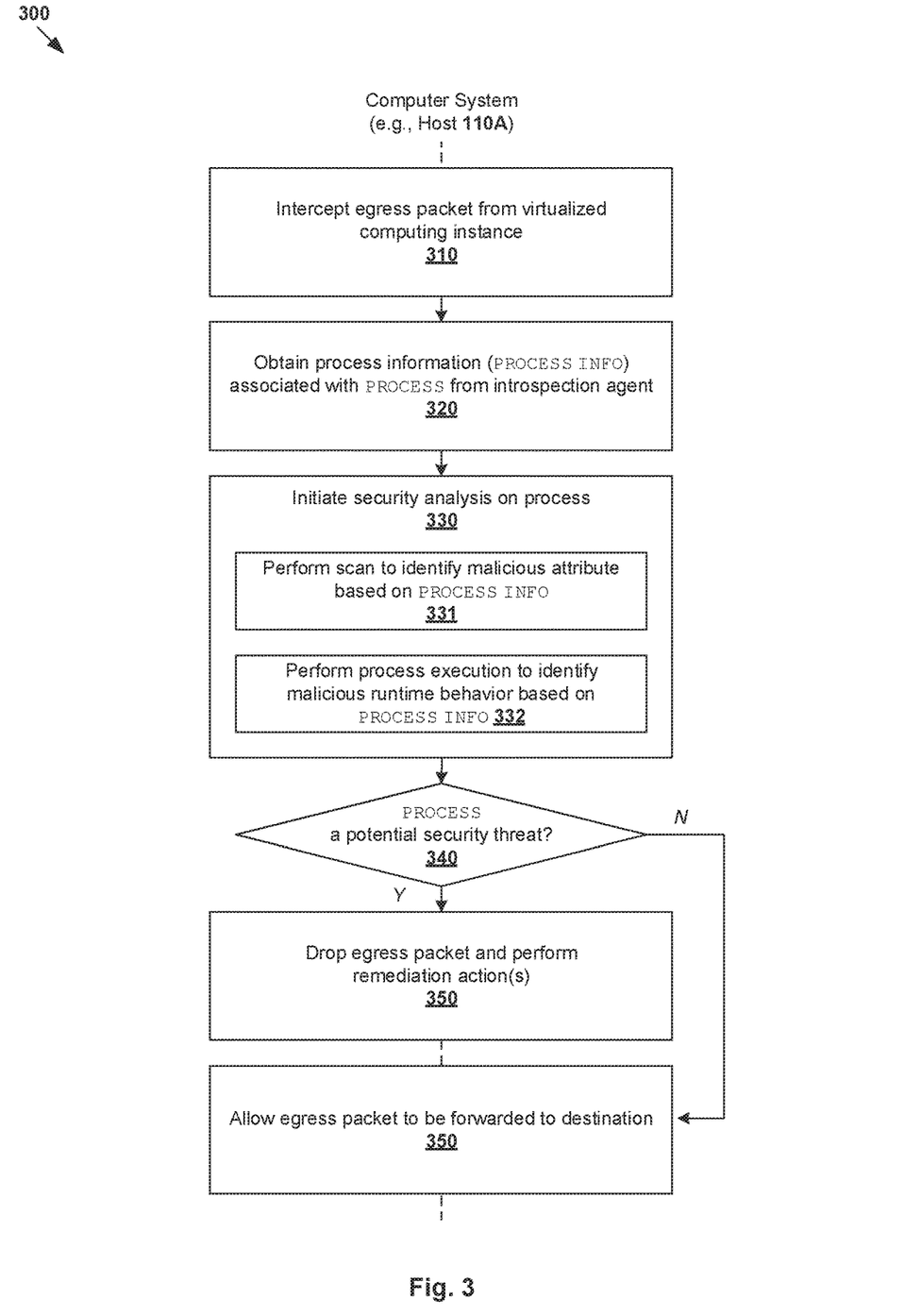
FIG. 3 is a flowchart of an example process for a computer system to perform security threat detection based on process information in an SDN environment.

In more detail, FIG. 3 is a flowchart of example process 300 for a computer system to perform security threat detection based on process information in SDN environment 100. Example process 300 may include one or more operations, functions, or actions illustrated by one or more blocks, such as 310 to 350. The various blocks may be combined into fewer blocks, divided into additional blocks, and/or eliminated depending on the desired implementation. Examples of the present disclosure may be implemented by any suitable "computer system," such as host 110A/110B using DFW engine 118A/118B and a guest introspection agent (e.g., 201 in FIG. 2) running on guest OS 151/152/153/154 of VM 131/132/133/134.

At 310 in FIG. 3, host-A 110A may intercept an egress packet from VM1 131 to pause (or temporarily block) the forwarding of the egress packet towards a destination. For example in FIG. 2, egress packet 210 may originate from PROC1 141 running on VM1 131 for forwarding towards destination 202. As will be discussed further using FIGS. 4-6, destination 202 may be a DNS resolver, in which case egress packet 210 may be a DNS query to resolve a domain name that is potentially associated with a rogue system (e.g., botnet). In another example, egress packet 210 may be a data packet that is potentially destined for a rogue system (e.g., centralized control center, member of a botnet).

At 320 in FIG. 3, host-A 110A may obtain process information associated with a process (e.g., PROC1 141) from which the egress packet originates. The term "obtaining" may refer generally to retrieving or receiving information. In the example in FIG. 2, VM1 131 may be configured to support guest introspection agent 201 running on guest OS 151 of VM1 131. In this case, block 320 may involve generating and sending a request (see 220) to retrieve process information (see 221) associated with PROC1 141 from guest introspection agent 201 (also referred to as "introspection agent").

At 330 in FIG. 3, host-A 110A may initiate a security analysis of PROC1 141 based on the process information obtained at block 320. For example, the security analysis may involve performing a preliminary analysis of the egress packet in the form of a DNS query, where the result of the DNS query may indicate that the egress packet resolves to a domain name associated with a botnet or is an egress packet destined for a member of the botnet. Based on resolving the egress packet to a domain name associated with a botnet or a packet destined for a member of the botnet, the security analysis may further involve (a) performing scan(s) based on process information 221 to identify malicious attribute(s) associated with PROC1 141. Additionally or alternatively, the security analysis may involve (b) performing process execution in a test environment to identify malicious runtime behavior associated with PROC1 141. See also 230-231 in FIG. 2.

As will be discussed using FIGS. 4-6, the term "process information" may refer generally to any suitable information associated with PROC1 141, such as process binary information, process memory information, etc. In one example, host-A 110A may initiate a static scan based on the process binary information and/or a memory scan based on the process memory information. In another example, host-A 110A may initiate execution of the process binary information in a test environment (e.g., sandbox 204) that is isolated from a production environment in which VM1 131 operates. Depending on the desired implementation, the security analysis may be performed locally on host-A 110A, remotely on security analysis engine 203 or a combination of both. See also 240-241 in FIG. 2.

At 340-350 in FIG. 3, in response to determination that PROC1 141 is a potential security threat based on the security analysis, host-A 110A may drop egress packet 210 and perform any suitable remediation action(s). This indicates that PROC1 141 might have been infected with malware. See 250 in FIG. 2, where egress packet 210 is dropped. Otherwise, at 360, host-A 110A may egress packet 210 may be allowed to be forwarded towards destination 202.

Examples of the present disclosure may be implemented to provide improve defense against any suitable malware. Throughout the present disclosure, the term "malware" may be used as an umbrella term to cover hostile or intrusive software, including but not limited to botnets (to be discussed below), viruses, worms, Trojan horse programs, spyware, phishing, adware, riskware, rookits, spams, scareware, ransomware, or any combination thereof.

Botnet Detection

Figure 4:
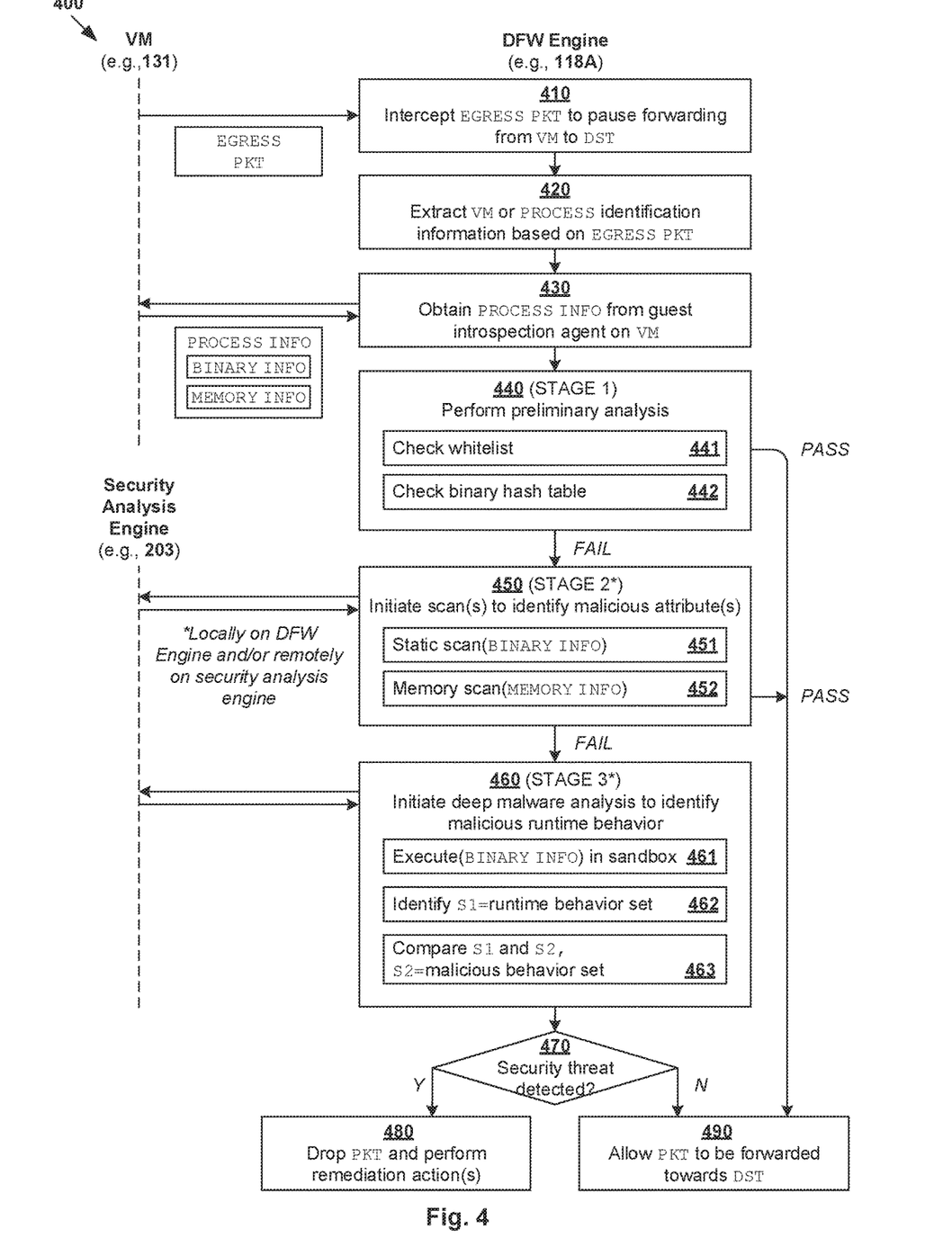
FIG. 4 is a flowchart of an example detailed process for a computer system to perform security threat detection based on process information in an SDN environment.

FIG. 4 is a flowchart of example detailed process 400 for security threat detection based on process information in SDN environment 100. Example process 400 may include one or more operations, functions, or actions illustrated at 410 to 460. The various operations, functions or actions may be combined into fewer blocks, divided into additional blocks, and/or eliminated depending on the desired implementation. The example in FIG. 4 will be explained using FIG. 5, which is a schematic diagram illustrating first example 500 of security threat detection relating to a botnet.

(a) Botnet

Figure 5:
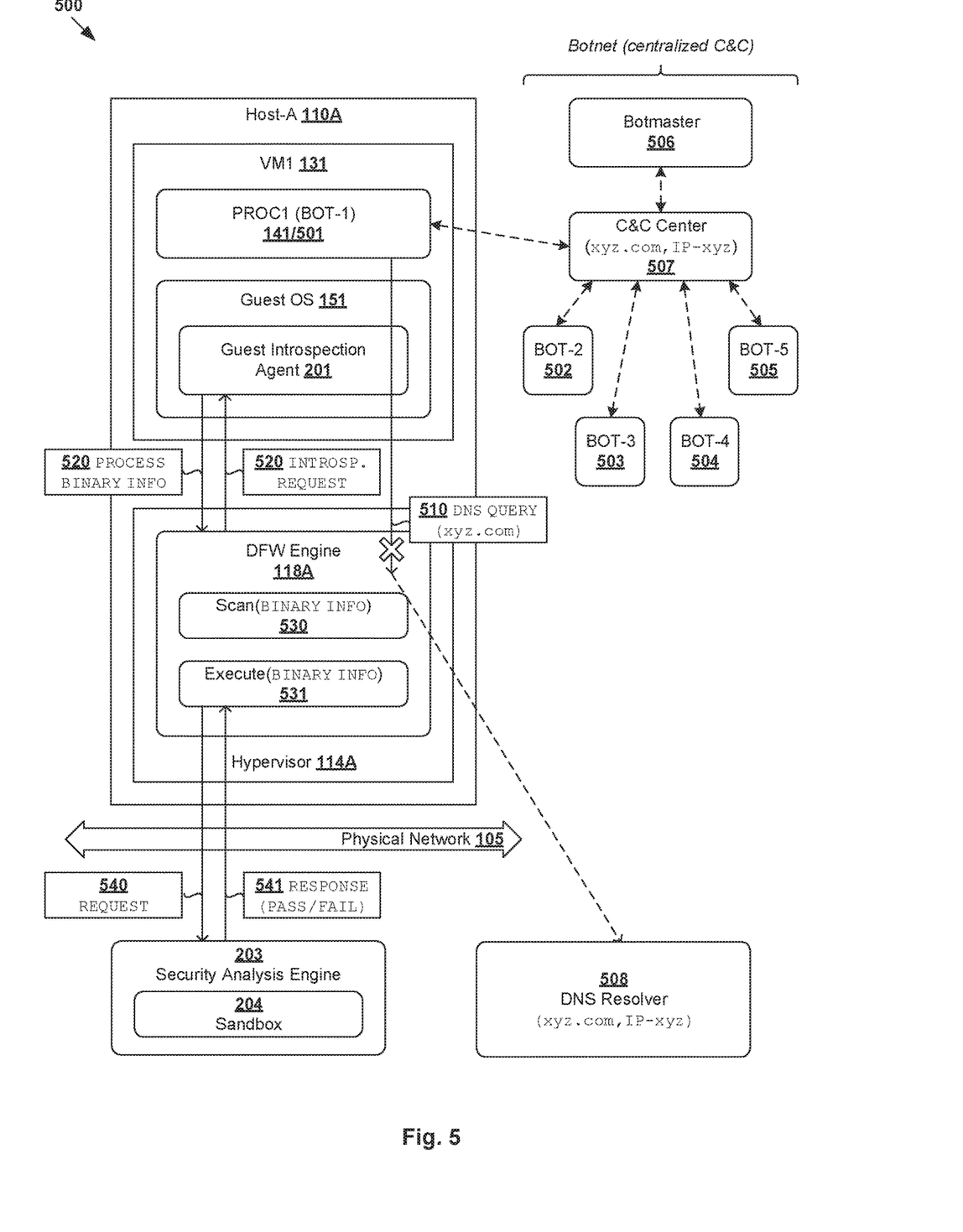
FIG. 5 is a schematic diagram illustrating a first example of security threat detection relating to a botnet in an SDN environment.

In the example in FIG. 5, VM1 131 may be infected with botnet malware. Here, the term "botnet" may refer generally to a network of multiple (N) compromised entities ("bots") that are remotely controlled by a master (i.e., botmaster). For example, a network of N=5 bots may include a first bot (see "BOT-1" 501) running on VM1 131 as well as bots 502-505, which may be virtual and/or physical entities inside or outside of a data center. A malicious attacker operating botmaster 506 may control bots 501-505 using command and control (C&C) center 507.

Unlike viruses or worms that are designed to attack VM1 131 and/or other VMs on host-A 110A, BOT-1 501 may receive instructions or commands from botmaster 506 as part of a distributed attack platform. Botnet-related activities may be classified into several stages. A first stage may involve botmaster 506 searching for a vulnerable target (e.g., VM1 131) to infect. A second stage may involve installing malware (e.g., bot code) on the vulnerable target. A third stage may involve BOT-1 501 running on VM1 131 initiating a sign-on process by connecting to botmaster 506 and/or C&C center 507. BOT-1 501 may also attempt to download malware payload from C&C center 507.

(b) Guest Introspection

Examples of the present disclosure may be implemented to detect, and block, attempt(s) by BOT-1 501 running on VM1 131 to connect with botmaster 506 via C&C center 507. To download malicious content from C&C center 507, BOT-1 501 has to resolve a domain name (e.g., www.xyz.com) into an IP address. In this case, BOT-1 501 may generate and send a DNS query (see 510) to request destination=DNS resolver 508 for a translation of a domain name (e.g., www.xyz.com) to a routable network address (e.g., IP address=IP-xyz).

In practice, botnets may employ advanced malware techniques to avoid detection, such as fast flux networks, domain name generation algorithms, etc. In general, fast flux is a DNS technique that replaces an IP address behind a domain name (e.g., www.xyz.com) in substantially quick succession. This way, traffic to C&C center 507 may bypass conventional firewall approaches that rely on URL-based reputation or IP address blacklisting. Further, by coupling fast flux networks with domain name generation algorithms, a malicious attacker (e.g., botmaster 506) may flux domain names, IP addresses and name servers managing the IP addresses to avoid detection.

To improve defense against botnet, at 410 in FIG. 4, DFW engine 118A may intercept an egress packet (see 510) from VM1 131 to destination=DNS resolver 508. Through interception, the forwarding of egress packet 510 towards its destination may be paused or blocked until cleared by DFW engine 118A. In the example in FIG. 5, egress packet 510 may be a DNS query for DNS resolver 508 to resolve a domain name (e.g., www.xyz.com) into an IP address associated with C&C center 507.

At 420 in FIG. 4, in response to detecting DNS query 510, DFW engine 118A may extract identification information associated with VM1 131 and/or a process (in this case BOT-1 501) from which DNS query 510 originates. Any suitable identification information may be extracted from DNS query 510, such as IP address, MAC address, TCP or UDP port number, process name or ID, VM name or ID, etc.

At 430 in FIG. 4, DFW engine 118A may interact with guest introspection agent 201 on VM1 131 to obtain process information associated with BOT-1 501. One approach may include DFW engine 118A generating and sending a request for process information 520 based on the identification information (e.g., VM name or ID, process name or ID, etc.). Any suitable process information associated with BOT-1 501 may be requested, including process binary information (see 520 in FIG. 5), process memory information (to be discussed using FIG. 6), etc. Guest introspection agent 201 may respond with file path(s) or link(s) to the process information. For example, a file event handler may be called whenever a file request is intercepted on VM1 131. Based on the file request associated with a particular file event type, the file event handler may read file content from VM1 131 using any suitable application programming interface (API) calls.

As used herein, the term "binary information" may refer generally to executable program code, such as binary file(s), program library, static information associated with binary file(s), etc. The term "memory information" may refer generally to data and code stored in a memory address space accessible by BOT-1 501. The memory address space may be allocated guest virtual memory address space, which is mapped to guest physical memory address space maintained by guest OS 151. The guest physical memory address space may be mapped to host physical memory address space of host-A 110A, the mapping of which may be maintained by hypervisor 114A.

At 440 in FIG. 4, DFW engine 118A may perform a preliminary analysis to determine whether BOT-1 501 is a potential security threat based on DNS query 520 and/or process binary information 520. One example may involve a whitelist check by comparing domain name (e.g., www.xyz.com) in DNS query 520 with a whitelist of reputable domain names (see 441). During the whitelist check, certificate information extracted from process binary information 520 (e.g., valid signed binary file(s)) may be compared against a certificate-based whitelist. Another example may involve a binary hash table check to determine whether process binary information 520 is found in the table of reputable binary information (see 442). If there is a match with an entry of the whitelist and/or binary hash table, DFW engine 118A may allow the forwarding of DNS query 520 towards DNS resolver 508. Otherwise, more in-depth security analysis may be performed according to block 450 and/or 460.

(c) Static Scan

At 450 in FIG. 4, DFW engine 118A may initiate a static scan of process binary information 520 to detect any malicious attribute(s) associated with BOT-1 501. The static scan may be a relatively quick scan (e.g., in milliseconds) that is performed locally on host-A 110A, or remotely using security analysis engine 203. For example, block 450 may involve scanning static information associated with BOT-1 501, including but not limited to signer certificate, import table, binary entropy, strings, message digest 5 (MD5) reputation information, etc. See also 530 in FIG. 5.

In practice, a signer certificate may be scanned to determine whether process binary information 520 is from a trusted source or vendor. An import table may be scanned to identify whether a new import table has been created by BOT-1 501. This is because malware is generally packed, and packed malware generally obfuscates the original import table. The "new" import table created by malware generally has fewer functions than a normal (non-infected) application. Binary entropy may be scanned to identify whether it has high entropy, which indicates a packed (obfuscated) executable often found in malware. Further, strings used by BOT-1 501 may be scanned to identify any suspicious strings commonly used in malware, such as blacklisted URL, threat actor names, exploit kit names, etc.

Based on the static scan at block 440, DFW engine 118A may determine whether BOT-1 501 is a potential security threat. If no malicious attribute is found (result=PASS), DFW engine 118A may determine that process binary information 520 is known and not malicious, in which case DNS query 510 is allowed to continue towards DNS resolver 508 according to block 490. Otherwise (result=FAIL), a deep malware analysis may be performed as follows. Depending on the desired implementation, deep malware analysis may be performed regardless of the result of the static scan.

(d) Deep Malware Analysis

At 460 in FIG. 4, DFW engine 118A may initiate a deep malware analysis in an isolated test environment (e.g., sandbox 204). Block 460 may involve executing process binary information 520 in sandbox 204 to identify a first set of runtime behaviors associated with BOT-1 501 (S1). The first set identified within the test environment is then compared with a second set of known malicious behaviors (S2). if there is match between S1 and S2, DFW engine 118A may determine that malware is detected and BOT-1 501 is a potential security threat. See 461-463 in FIG. 4.

Any suitable malicious behavior(s) may be detected at block 460. One example malicious behavior may involve unsigned binary information attempting to change the settings of guest OS 151, such as BOT-1 501 registering a new service or browser helper object (as detected in sandbox 204). In practice, only trusted binary information from reputable vendors are usually allowed to change such settings. Another example may involve BOT-1 501 disabling security software, such as firewall, anti-virus software, etc. In response to detecting malicious runtime behavior(s), BOT-1 501 may be identified as a potential security threat at 470.

The deep malware analysis at block 460 may be performed locally on host-A 110A, remotely using security analysis engine 203, or a combination thereof. In the example in FIG. 5, DFW engine 118A may initiate the deep malware analysis on security analysis engine 203 by sending an instruction or request (see 540). Security analysis engine 203 may support sandbox 204, which is an isolated test environment for executing process binary information 520. Sandbox 204 is independent from a production environment in which BOT-1 501 runs on VM1 131. Note that similar sandbox may be implemented on host-A 110A. Once completed, security analysis engine 203 may inform DFW engine 118A accordingly (see 541 in FIG. 5).

At 470 and 480, DFW engine 118A may determine that malware is detected and BOT-1 501 running on VM1 131 is a potential security threat. In this case, DFW engine 118A may drop egress packet=DNS query 510 and perform any suitable remediation action(s). For example, DFW engine 118A may send an alarm or notification message to inform SDN controller 180 of the potential security threat. SDN controller 180 and/or SDN manager 184 may then send an alert to a user (e.g., network administrator). Depending on the desired implementation, SDN controller 180 may instruct host-A 110A to terminate BOT-1 501 and isolate VM1 131. To assess whether other processes on VM1 131 are infected, additional forensic analysis may be performed.

Although explained using DNS query 510, it should be noted other types of traffic from BOT-1 501 may be intercepted by DFW engine 118A. For example, the intercepted egress packet may be generated based on any suitable communication protocol(s), such as Internet Relay Chat (IRC), Hyper Text Transfer Protocol (HTTP), TCP, UDP, etc. For example, BOT-1 501 may attempt to connect to an IRC server to join an IRC channel as a first step of their lifecycle to get commands from botmaster 506 via C&C center 507. Egress packet 510 may also be intercepted as part of a server connection process, such as TCP handshaking, etc.

Botnet Detection Based on Memory Scan

Figure 6:
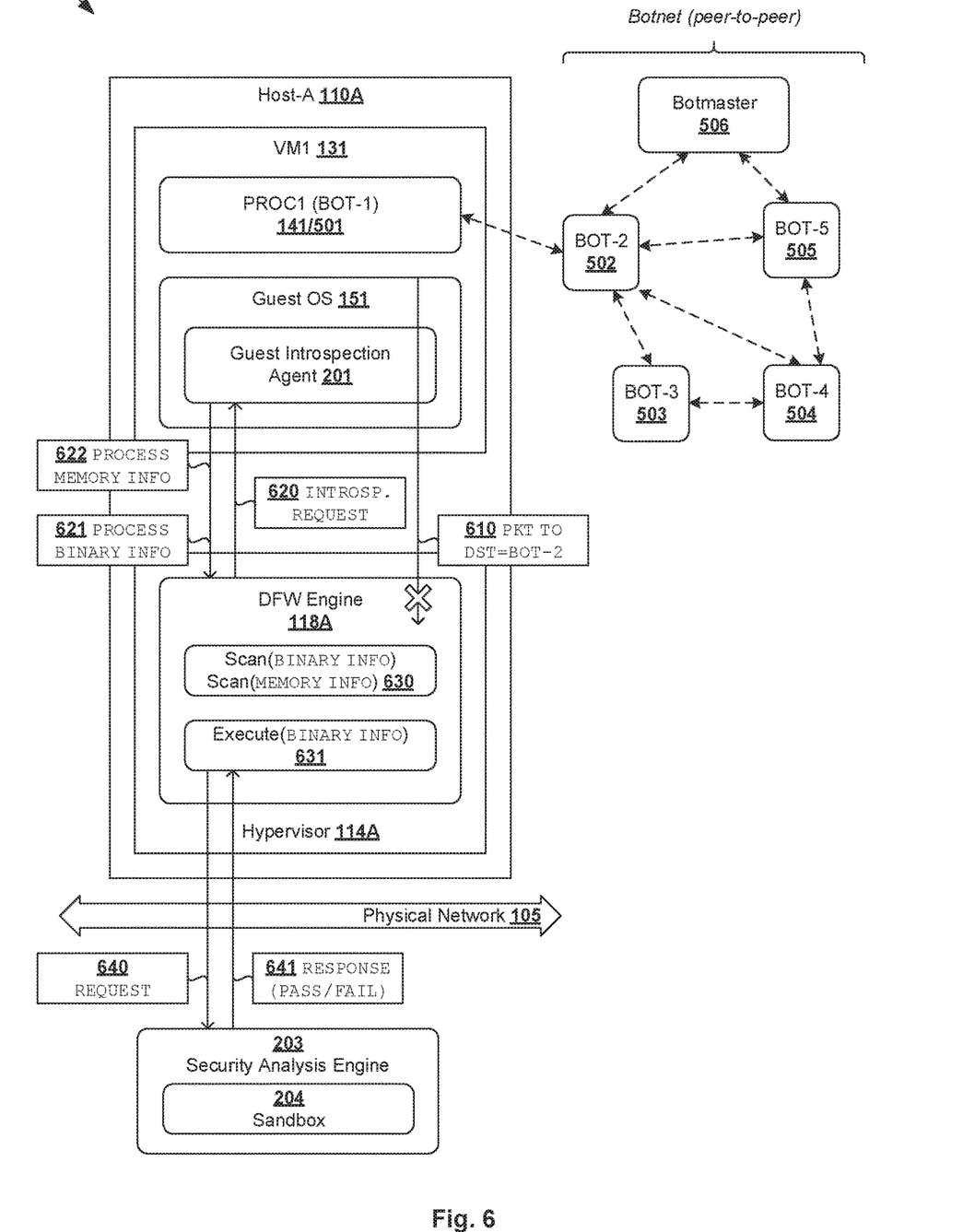
FIG. 6 is a schematic diagram illustrating a second example of security threat detection relating to a botnet in an SDN environment.

FIG. 6 is a schematic diagram is a second example 600 of security threat detection relating to a botnet. Compared with FIG. 5, BOT-1 501 may be a member of a botnet that communicates via a peer-to-peer (P2P) network. Instead of using a centralized approach with C&C center 507 in FIG. 5, each of bots 501-505 may act as (1) a server for distributing commands and (2) a client for receiving commands. This decentralized approach avoids having a single point of failure. For example, BOT-1 501 may attempt to communicate with BOT-2 502, which in turns communicates with botmaster 506 as well as other bots 503-505.

Using the example in FIG. 4, DFW engine 118A may intercept egress packet (see 610) to destination=BOT-2 502 and obtain process information (see 620-622) associated with BOT-1 501 from guest introspection agent 201. Based on the process information, a security analysis may be performed to determine whether BOT-1 501 is a potential security threat (see 630-631, 640-641). Implementation details explained using FIG. 5 are also applicable and not repeated here for brevity.

In addition to process binary information 620, DFW engine 118A may also obtain process memory information (see 622) from guest introspection agent 201 to facilitate a memory scan. Any suitable memory scanning steps may be performed to identify malicious attribute(s) associated with memory information 622. One example may involve scanning memory information 622 to search for any shellcode pattern in the executable section of the memory accessible by BOT-1 501. In the case of in-memory malware, shellcodes are usually present on memory.

Another example may involve using a memory analysis engine (e.g., YARA) capable of identifying malware (or malware families) based on textual or binary patterns identifiable from memory information 622. Malware samples executing in memory may be also detected based on known malware signatures. By performing security analysis based on process information 620-622, examples of the present disclosure may be implemented to detect more advanced malware techniques that are capable of bypassing conventional URL-based and IP blacklisting approaches. This way, the risk of malware infection may be reduced in SDN environment 100.

Container Implementation

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 6, container technologies may be used to run various containers inside respective VMs 131-134. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 6. For example, the instructions or program code, when executed by the processor of the computer system, may cause the processor to implement examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

We claim:

1. A method for a computer system to perform security threat detection, wherein the method comprises:
   intercepting, by the computer system, an egress packet from a virtualized computing instance running on the computer system itself to pause forwarding of the egress packet towards a destination;
   obtaining, by the computer system, process information from an introspection agent running on the virtualized computing instance, wherein the process information is associated with a process from which the egress packet originates, and the process runs on the virtualized computing instance;
   based on the obtained process information, initiating, by the computer system, a security analysis of the process; and
   in response to determination that the running process is a potential security threat based on the security analysis, dropping, by the computer system, the egress packet and performing, by the computer system, a remediation action; but otherwise, allowing, by the computer system, forwarding of the egress packet towards the destination.

2. The method of claim 1, wherein obtaining the process information comprises:
   based on the egress packet, extracting identification information associated with the virtualized computing instance or the process, or both; and
   based on the identification information, obtaining the process information from the introspection agent.

3. The method of claim 1, wherein initiating the security analysis comprises:
   performing a preliminary analysis of the egress packet in the form of a domain name service (DNS) query, wherein the result of the DNS query indicates that the egress packet resolves to a domain name associated with a botnet or the egress packet is destined for a member of the botnet.

4. The method of claim 3, wherein based on resolving the egress packet to a domain name associated with a botnet or the egress packet being destined for a member of the botnet, the security analysis further comprises performing one or more of the following:
   (a) a scan to identify at least one malicious attribute associated with the process based on the process information; and
   (b) a process execution in a test environment to identify at least one malicious runtime behavior associated with the process based on the process information.

5. The method of claim 4, wherein initiating the security analysis comprises:
   based on the process information that includes binary information associated with the process, executing the binary information in the test environment that is isolated from a production environment in which the virtualized computing instance operates.

6. The method of claim 4, wherein initiating the security analysis comprises:
   based on the process information that includes binary information associated with the process, performing a static scan to identify the at least one malicious attribute from the binary information.

7. The method of claim 4, wherein initiating the security analysis comprises:
   based on the process information that includes memory information associated with the process, performing a memory scan to identify the at least one malicious attribute from the memory information.

8. A non-transitory computer-readable storage medium that includes a set of instructions which, in response to execution by a physical processor of a computer system, cause the physical processor to perform security threat detection, wherein the method comprises:
   intercepting, by the computer system itself, an egress packet from a virtualized computing instance running on the computer system to pause forwarding of the egress packet towards a destination;
   obtaining, by the computer system, process information from an introspection agent running on the virtualized computing instance, wherein the process information is associated with a process from which the egress packet originates, and the process runs on the virtualized computing instance;
   based on the obtained process information, initiating, by the computer system, a security analysis of the process; and
   in response to determination that the running process is a potential security threat based on the security analysis, dropping, by the computer system, the egress packet and performing, by the computer system, a remediation action; but otherwise, allowing, by the computer system, forwarding of the egress packet towards the destination.

9. The non-transitory computer-readable storage medium of claim 8, wherein obtaining the process information comprises:
   based on the egress packet, extracting identification information associated with the virtualized computing instance or the process, or both; and
   based on the identification information, obtaining the process information from the introspection agent.

10. The non-transitory computer-readable storage medium of claim 8, wherein initiating the security analysis comprises:
   performing a preliminary analysis of the egress packet in the form of a domain name service (DNS) query, wherein the result of the DNS query indicates that the egress packet resolves to a domain name associated with a botnet or the egress packet is destined for a member of the botnet.

11. The non-transitory computer-readable storage medium of claim 10, wherein based on resolving the egress packet to a domain name associated with a botnet or the egress packet being destined for a member of the botnet, the security analysis further comprises performing one or more of the following:
   (a) a scan to identify at least one malicious attribute associated with the process based on the process information; and
   (b) a process execution in a test environment to identify at least one malicious runtime behavior associated with the process based on the process information.

12. The non-transitory computer-readable storage medium of claim 11, wherein initiating the security analysis comprises:
   based on the process information that includes binary information associated with the process, executing the binary information in the test environment that is isolated from a production environment in which the virtualized computing instance operates.

13. The non-transitory computer-readable storage medium of claim 11, wherein initiating the security analysis comprises:
   based on the process information that includes binary information associated with the process, performing a static scan to identify the at least one malicious attribute from the binary information.

14. The non-transitory computer-readable storage medium of claim 11, wherein initiating the security analysis comprises:
   based on the process information that includes memory information associated with the process, performing a memory scan to identify the at least one malicious attribute from the memory information.

15. A computer system, comprising:
   a physical processor; and
   a non-transitory computer-readable medium having stored thereon instructions that, when executed by the physical processor, cause the physical processor to:
   intercept an egress packet from a virtualized computing instance running on the computer system itself to pause forwarding of the egress packet towards a destination;
   obtain process information from an introspection agent running on the virtualized computing instance, wherein the process information is associated with a process from which the egress packet originates, and the process rungs on the virtualized computing instance;
   based on the obtained process information, initiate a security analysis of the process; and
   in response to determination that the running process is a potential security threat based on the security analysis, drop the egress packet and perform a remediation action; but otherwise, allow forwarding of the egress packet towards the destination.

16. The computer system of claim 15, wherein the instructions for obtaining the process information cause the physical processor to:
   based on the egress packet, extract identification information associated with the virtualized computing instance or the process, or both; and
   based on the identification information, obtain the process information from the introspection agent.

17. The computer system of claim 15, wherein the instructions for initiating the security analysis cause the physical processor to:
   perform a preliminary analysis of the egress packet in the form of a domain name service (DNS) query, wherein the result of the DNS query indicates that the egress packet resolves to a domain name associated with a botnet or the egress packet is destined for a member of the botnet.

18. The computer system of claim 17, wherein, based on resolving the egress packet to a domain name associated with a botnet or the egress packet being destined for a member of the botnet, the instructions for the security analysis cause the physical processor to perform one or more of the following:
   (a) a scan to identify at least one malicious attribute associated with the process based on the process information; and
   (b) a process execution in a test environment to identify at least one malicious runtime behavior associated with the process based on the process information.

19. The computer system of claim 18, wherein the instructions for initiating the security analysis cause the physical processor to:
   based on the process information that includes binary information associated with the process, execute the binary information in the test environment that is isolated from a production environment in which the virtualized computing instance operates.

20. The computer system of claim 18, wherein the instructions for initiating the security analysis cause the physical processor to:
   based on the process information that includes binary information associated with the process, perform a static scan to identify the at least one malicious attribute from the binary information.

21. The computer system of claim 18, wherein the instructions for initiating the security analysis cause the physical processor to:
   based on the process information that includes memory information associated with the process, perform a memory scan to identify the at least one malicious attribute from the memory information.

\* \* \* \* \*